(12) United States Patent
Schwartz et al.

(10) Patent No.: US 8,488,031 B2
(45) Date of Patent: Jul. 16, 2013

(54) CHROMATIC NOISE REDUCTION METHOD AND APPARATUS

(75) Inventors: Tomer Schwartz, Even Yehuda (IL); Eyal Ben-Eliezer, Kiryat Uno (IL); Orly Liba, Tel Aviv (IL); Noy Cohen, Tel Aviv (IL)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 377 days.

(21) Appl. No.: 13/007,524

(22) Filed: Jan. 14, 2011

(65) Prior Publication Data

US 2012/0182454 A1    Jul. 19, 2012

(51) Int. Cl.
*H04N 5/335* (2011.01)

(52) U.S. Cl.
USPC ............ 348/273; 348/E05.091; 348/E09.042; 348/E09.002; 382/162

(58) Field of Classification Search
USPC .......... 348/273, 242, 280, E05.091, E09.002, 348/E09.042; 382/162, 260
See application file for complete search history.

(56) References Cited

U.S. PATENT DOCUMENTS

2012/0293695 A1 * 11/2012 Tanaka ........................ 348/280
2012/0293696 A1 * 11/2012 Tanaka ........................ 348/280

* cited by examiner

*Primary Examiner* — Mekonen Bekele
(74) *Attorney, Agent, or Firm* — Hickman Palermo Truong Becker Bingham Wong LLP

(57) ABSTRACT

A chromatic noise reduction method is provided for removing chromatic noise from the pixels of a mosaic image. In one implementation, an actual chroma value and a de-noised chroma value are derived for the central pixel of a matrix of pixels. Based at least in part upon these chroma values, a final chroma value is derived for the central pixel. The final chroma value is then used, along with the actual luminance of the central pixel, to derive a final de-noised pixel value for the central pixel. By de-noising the central pixel based on its chroma (which takes into account more than one color) rather than on just the color channel of the central pixel, this method allows the central pixel to be de-noised in a more color-coordinated fashion. As a result, improved chromatic noise reduction is achieved.

34 Claims, 10 Drawing Sheets

| $G_1$ | $B_2$ | $G_3$ | $B_4$ | $G_5$ | $B_6$ | $G_7$ | $B_8$ |
|---|---|---|---|---|---|---|---|
| $R_9$ | $G_{10}$ | $R_{11}$ | $G_{12}$ | $R_{13}$ | $G_{14}$ | $R_{15}$ | $G_{16}$ |
| $G_{17}$ | $B_{18}$ | $G_{19}$ | $B_{20}$ | $G_{21}$ | $B_{22}$ | $G_{23}$ | $B_{24}$ |
| $R_{25}$ | $G_{26}$ | $R_{27}$ | $G_{28}$ | $R_{29}$ | $G_{30}$ | $R_{31}$ | $G_{32}$ |
| $G_{33}$ | $B_{34}$ | $G_{35}$ | $B_{36}$ | $G_{37}$ | $B_{38}$ | $G_{39}$ | $B_{40}$ |
| $R_{41}$ | $G_{42}$ | $R_{43}$ | $G_{44}$ | $R_{45}$ | $G_{46}$ | $R_{47}$ | $G_{48}$ |
| $G_{49}$ | $B_{50}$ | $G_{51}$ | $B_{52}$ | $G_{53}$ | $B_{54}$ | $G_{55}$ | $B_{56}$ |
| $R_{57}$ | $G_{58}$ | $R_{59}$ | $G_{60}$ | $R_{61}$ | $G_{62}$ | $R_{63}$ | $G_{64}$ |

*Fig. 1*

| 1 | 2 | 3 | 4 | 5 | 6 | 7 | 8 | 9 |
|---|---|---|---|---|---|---|---|---|
| 10 | 11 | 12 | 13 | 14 | 15 | 16 | 17 | 18 |
| 19 | 20 | 21 | 22 | 23 | 24 | 25 | 26 | 27 |
| 28 | 29 | 30 | 31 | 32 | 33 | 34 | 35 | 36 |
| 37 | 38 | 39 | 40 | 41 | 42 | 43 | 44 | 45 |
| 46 | 47 | 48 | 49 | 50 | 51 | 52 | 53 | 54 |
| 55 | 56 | 57 | 58 | 59 | 60 | 61 | 62 | 63 |
| 64 | 65 | 66 | 67 | 68 | 69 | 70 | 71 | 72 |
| 73 | 74 | 75 | 76 | 77 | 78 | 79 | 80 | 81 |

|  |  |  |  |  |  |  |  |  |
|---|---|---|---|---|---|---|---|---|
|  | $Y_{11}$ | $Y_{12}$ | $Y_{13}$ | $Y_{14}$ | $Y_{15}$ | $Y_{16}$ | $Y_{17}$ |  |
|  | $Y_{20}$ | $Y_{21}$ | $Y_{22}$ | $Y_{23}$ | $Y_{24}$ | $Y_{25}$ | $Y_{26}$ |  |
|  | $Y_{29}$ | $Y_{30}$ | $Y_{31}$ | $Y_{32}$ | $Y_{33}$ | $Y_{34}$ | $Y_{35}$ |  |
|  | $Y_{38}$ | $Y_{39}$ | $Y_{40}$ | $Y_{41}$ | $Y_{42}$ | $Y_{43}$ | $Y_{44}$ |  |
|  | $Y_{47}$ | $Y_{48}$ | $Y_{49}$ | $Y_{50}$ | $Y_{51}$ | $Y_{52}$ | $Y_{53}$ |  |
|  | $Y_{56}$ | $Y_{57}$ | $Y_{58}$ | $Y_{59}$ | $Y_{60}$ | $Y_{61}$ | $Y_{62}$ |  |
|  | $Y_{65}$ | $Y_{66}$ | $Y_{67}$ | $Y_{68}$ | $Y_{69}$ | $Y_{70}$ | $Y_{71}$ |  |
|  |  |  |  |  |  |  |  |  |

*Fig. 8A*

|  |  |  |  |  |  |  |  |  |
|---|---|---|---|---|---|---|---|---|
| $Y_{10}$ | $Y_{11}$ | $Y_{12}$ | $Y_{13}$ | $Y_{14}$ | $Y_{15}$ | $Y_{16}$ | $Y_{17}$ | $Y_{18}$ |
| $Y_{19}$ | $Y_{20}$ | $Y_{21}$ | $Y_{22}$ | $Y_{23}$ | $Y_{24}$ | $Y_{25}$ | $Y_{26}$ | $Y_{27}$ |
| $Y_{28}$ | $Y_{29}$ | $Y_{30}$ | $Y_{31}$ | $Y_{32}$ | $Y_{33}$ | $Y_{34}$ | $Y_{35}$ | $Y_{36}$ |
| $Y_{37}$ | $Y_{38}$ | $Y_{39}$ | $Y_{40}$ | $Y_{41}$ | $Y_{42}$ | $Y_{43}$ | $Y_{44}$ | $Y_{45}$ |
| $Y_{46}$ | $Y_{47}$ | $Y_{48}$ | $Y_{49}$ | $Y_{50}$ | $Y_{51}$ | $Y_{52}$ | $Y_{53}$ | $Y_{54}$ |
| $Y_{55}$ | $Y_{56}$ | $Y_{57}$ | $Y_{58}$ | $Y_{59}$ | $Y_{60}$ | $Y_{61}$ | $Y_{62}$ | $Y_{63}$ |
| $Y_{64}$ | $Y_{65}$ | $Y_{66}$ | $Y_{67}$ | $Y_{68}$ | $Y_{69}$ | $Y_{70}$ | $Y_{71}$ | $Y_{72}$ |
|  |  |  |  |  |  |  |  |  |

*Fig. 8B*

| $Y_1=$ $Y_{10}$ | $Y_2=$ $Y_{11}$ | $Y_3=$ $Y_{12}$ | $Y_4=$ $Y_{13}$ | $Y_5=$ $Y_{14}$ | $Y_6=$ $Y_{15}$ | $Y_7=$ $Y_{16}$ | $Y_8=$ $Y_{17}$ | $Y_9=$ $Y_{18}$ |
|---|---|---|---|---|---|---|---|---|
| $Y_{10}$ | $Y_{11}$ | $Y_{12}$ | $Y_{13}$ | $Y_{14}$ | $Y_{15}$ | $Y_{16}$ | $Y_{17}$ | $Y_{18}$ |
| $Y_{19}$ | $Y_{20}$ | $Y_{21}$ | $Y_{22}$ | $Y_{23}$ | $Y_{24}$ | $Y_{25}$ | $Y_{26}$ | $Y_{27}$ |
| $Y_{28}$ | $Y_{29}$ | $Y_{30}$ | $Y_{31}$ | $Y_{32}$ | $Y_{33}$ | $Y_{34}$ | $Y_{35}$ | $Y_{36}$ |
| $Y_{37}$ | $Y_{38}$ | $Y_{39}$ | $Y_{40}$ | $Y_{41}$ | $Y_{42}$ | $Y_{43}$ | $Y_{44}$ | $Y_{45}$ |
| $Y_{46}$ | $Y_{47}$ | $Y_{48}$ | $Y_{49}$ | $Y_{50}$ | $Y_{51}$ | $Y_{52}$ | $Y_{53}$ | $Y_{54}$ |
| $Y_{55}$ | $Y_{56}$ | $Y_{57}$ | $Y_{58}$ | $Y_{59}$ | $Y_{60}$ | $Y_{61}$ | $Y_{62}$ | $Y_{63}$ |
| $Y_{64}$ | $Y_{65}$ | $Y_{66}$ | $Y_{67}$ | $Y_{68}$ | $Y_{69}$ | $Y_{70}$ | $Y_{71}$ | $Y_{72}$ |
| $Y_{73}=$ $Y_{64}$ | $Y_{74}=$ $Y_{65}$ | $Y_{75}=$ $Y_{66}$ | $Y_{76}=$ $Y_{67}$ | $Y_{77}=$ $Y_{68}$ | $Y_{78}=$ $Y_{69}$ | $Y_{79}=$ $Y_{70}$ | $Y_{80}=$ $Y_{71}$ | $Y_{81}=$ $Y_{72}$ |

*Fig. 8C*

$$902 \rightarrow \begin{pmatrix} 1 & 0 & 1 & 0 & 1 & 0 & 1 & 0 & 1 \\ 0 & 0 & 0 & 0 & 0 & 0 & 0 & 0 & 0 \\ 1 & 0 & 1 & 0 & 2 & 0 & 1 & 0 & 1 \\ 0 & 0 & 0 & 0 & 0 & 0 & 0 & 0 & 0 \\ 1 & 0 & 2 & 0 & 4 & 0 & 2 & 0 & 1 \\ 0 & 0 & 0 & 0 & 0 & 0 & 0 & 0 & 0 \\ 1 & 0 & 1 & 0 & 2 & 0 & 1 & 0 & 1 \\ 0 & 0 & 0 & 0 & 0 & 0 & 0 & 0 & 0 \\ 1 & 0 & 1 & 0 & 1 & 0 & 1 & 0 & 1 \end{pmatrix}$$

*Fig. 9A*

$$904 \rightarrow \begin{pmatrix} 1 & 0 & 1 & 0 & 1 & 0 & 1 & 0 & 1 \\ 0 & 1 & 0 & 1 & 0 & 1 & 0 & 1 & 0 \\ 1 & 0 & 1 & 0 & 2 & 0 & 1 & 0 & 1 \\ 0 & 1 & 0 & 4 & 0 & 4 & 0 & 1 & 0 \\ 1 & 0 & 2 & 0 & 8 & 0 & 2 & 0 & 1 \\ 0 & 1 & 0 & 4 & 0 & 4 & 0 & 1 & 0 \\ 1 & 0 & 1 & 0 & 2 & 0 & 1 & 0 & 1 \\ 0 & 1 & 0 & 1 & 0 & 1 & 0 & 1 & 0 \\ 1 & 0 & 1 & 0 & 1 & 0 & 1 & 0 & 1 \end{pmatrix}$$ *Fig. 9B*

Filter = Filter + 904        902

$$906 \rightarrow \begin{pmatrix} 0 & 0 & 0 & 0 & 0 & 0 & 0 & 0 & 0 \\ 0 & 1 & 0 & 1 & 0 & 1 & 0 & 1 & 0 \\ 0 & 0 & 0 & 0 & 0 & 0 & 0 & 0 & 0 \\ 0 & 1 & 0 & 4 & 0 & 4 & 0 & 1 & 0 \\ 0 & 0 & 0 & 0 & 4 & 0 & 0 & 0 & 0 \\ 0 & 1 & 0 & 4 & 0 & 4 & 0 & 1 & 0 \\ 0 & 0 & 0 & 0 & 0 & 0 & 0 & 0 & 0 \\ 0 & 1 & 0 & 1 & 0 & 1 & 0 & 1 & 0 \\ 0 & 0 & 0 & 0 & 0 & 0 & 0 & 0 & 0 \end{pmatrix}$$

*Fig. 9C*

CHROMATIC NOISE REDUCTION METHOD AND APPARATUS

BACKGROUND

Many of today's digital video devices capture a color image using a color filter array (CFA) and an array of optical sensors that is overlaid by the CFA. The CFA has a plurality of filter elements, each of which overlays one of the optical sensors in the optical sensor array, and each filter element is designed to pass only one color of light. The most common type of CFA is the Bayer pattern filter (also referred to as a Bayer filter), an example of which is shown in FIG. 1. The Bayer filter comprises filter elements that pass three different colors of light: green (G), blue (B), and red (R). These filter elements are arranged in alternating rows of green-blue and red-green. With this pattern, red and blue filter elements appear on every other row and every other column, while green filter elements appear on every row and every column. This pattern exploits the human eye's higher sensitivity to green light.

As noted, each filter element passes light of only one color. Thus, in the Bayer filter of FIG. 1, filter element $G_1$ passes only green light, filter element $B_2$ passes only blue light, and filter element $R_9$ passes only red light. This means that the optical sensor behind filter element $G_1$ senses only the green portion of the light that hits filter element $G_1$, the optical sensor behind filter element $B_2$ senses only the blue portion of the light that hits filter element $B_2$, and the optical sensor behind filter element $R_9$ senses only the red portion of the light that hits filter element $R_9$. Thus, because of the CFA, the image captured by the sensor array is a mosaic image. As used herein, the term mosaic image refers to an image in which there is only partial color information for each pixel of the image. In the case of a mosaic image captured using a Bayer filter, there is only information for one of the three color channels of green, blue, and red for each pixel.

After capturing a mosaic image through the Bayer filter, the array of optical sensors outputs a plurality of values. Each value comes from one of the optical sensors, and each value corresponds to a particular pixel of the image (each optical sensor represents a pixel). Since each pixel corresponds to one of the optical sensors, and since each optical sensor corresponds to one of the filter elements of the Bayer filter, each pixel in turn corresponds to one of the filter elements of the Bayer filter. For each pixel, only one of the three color values is provided by the optical sensor array. This color value will be referred to herein as the sensed pixel value. In the example of FIG. 1, the sensed pixel value provided by the optical sensor array for pixel 1 is for the green color channel. Thus, pixel 1 is referred to as a green pixel. Similarly, the sensed pixel value for pixel 2 is for the blue color channel; thus, pixel 2 is referred to as a blue pixel. Similarly, pixel 9 is referred to as a red pixel.

In order to render a pixel in full color, a color value is needed for all three of the color channels. Since only one sensed pixel value (corresponding to one of the three color channels) is provided by the sensor array for each pixel, the other two color values need to be derived for each pixel, which means that for each pixel, there is one sensed pixel value and two derived pixel values (corresponding to the other two color channels). A demosaicing process is performed on the mosaic image to calculate the two derived pixel values for each pixel. Through the mosaicing and demosaicing process, a color image can be captured and reproduced.

The sensed pixel values provided by the sensor array may and most likely will include some noise components. These noise components may be due to various factors, such as environmental conditions, manufacturing variations in the optical sensors, etc., and the amount of noise may vary from sensor to sensor. This noise in the sensed pixel values can lead to the introduction of unwanted, spurious colors in the demosaiced image. For example, if the noise in the sensed pixel value for a blue pixel causes the blue component of the pixel to be too high, it may cause the final demosaiced version of that pixel to take on a color that does not reflect the true color of that pixel in the original image. This can lead to a strange and unpleasant image. To prevent this, most image processing systems perform some form of de-noising.

De-noising is often done by averaging the sensed pixel values of nearby pixels on a color channel by color channel basis. For example, a blue pixel of interest may be denoised by taking the sensed pixel values of neighboring blue pixels and averaging them (according to certain weights given to each pixel) with the sensed pixel value of the blue pixel of interest to derive a de-noised pixel value for the blue pixel of interest. A green pixel may be de-noised in the same way by taking into account the sensed pixel values of neighboring green pixels, and a red pixel may be de-noised by taking into account the sensed pixel values of neighboring red pixels. Thus, pixels are typically de-noised on a color channel by color channel basis (in other words, pixels of different colors are de-noised separately based on neighboring pixels of the same color).

It has been observed by Applicants, however, that each color channel is often noisy in its own unique way. For example, the blue color channel may be noisy in a different way from the red color channel. It has been observed that if the various color channels are de-noised separately, the color channels may becoming exaggeratedly decoupled from each other, which may lead to the appearance of prominent and colorful noise in the demosaiced image, particularly in gray areas. This colorful noise (also referred to as chromatic noise) in the demosaiced image may render the image unpleasant. To present such an undesirable result from arising, an improved de-noising method is needed.

BRIEF DESCRIPTION OF THE DRAWINGS

FIG. 1 depicts a sample Bayer pattern filter as an example of a color filter array.

FIG. 6 depicts a luminance filter that may be applied to a sub matrix of pixels to derive a luminance value for the middle pixel of the sub matrix, in accordance with one embodiment of the present invention.

FIG. 7 depicts a sample sub matrix on which the filter of FIG. 6 may be applied.

FIGS. 8A-8C illustrate how a luminance matrix may be generated, in accordance with one embodiment of the present invention.

FIGS. 9A-9C depict various sample filters that may be applied to the matrix of pixels shown in FIG. 5 and the luminance matrix shown in FIGS. 9A-9C, in accordance with one embodiment of the present invention.

DETAILED DESCRIPTION OF EMBODIMENT(S)

Overview

In accordance with one embodiment of the present invention, a chromatic noise reduction method is provided for removing chromatic noise from an image. In one embodiment, the method removes noise from a pixel by analyzing and operating on the chroma of the pixel rather than on just the color channel of the pixel. Since the chroma of a pixel accounts for more than just one color channel, denoising a pixel based on its chroma allows for a more color-coordinated de-noising of the pixel. As a result, improved chromatic noise reduction is achieved. In one embodiment, the method updates the chroma of a pixel while leaving its luminance unchanged.

Figure 2:
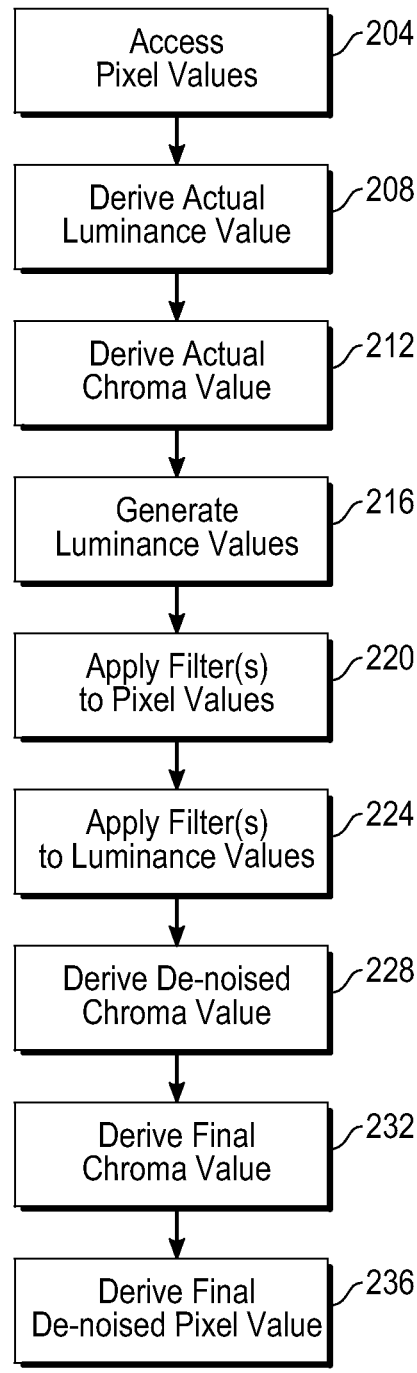
FIG. 2 depicts a high level flow diagram of a chromatic noise reduction method, in accordance with one embodiment of the present invention.

FIG. 2 shows a high level flow diagram of the chromatic noise reduction method, in accordance with one embodiment of the present invention. To de-noise a pixel, the method begins by accessing (block 204) a plurality of pixel values corresponding to a matrix of pixels. The matrix of pixels represents a portion of a mosaic image captured by an array of optical sensors that has been overlaid by a CFA (the CFA may have a Bayer pattern or some other color pattern), and the pixel values represent the sensed pixel values provided by the optical sensors for each of the pixels in the matrix. Since the captured image is a mosaic image, the optical sensors will provide a pixel value for only one of several predetermined colors for each pixel. The matrix has a central pixel. In one embodiment, the central pixel has been demosaiced so that it has a sensed pixel value (provided by a corresponding optical sensor) for one of the several colors and one or more derived pixel values for the other of the several colors. In one embodiment, the central pixel is the only pixel in the matrix that needs to be demosaiced.

After accessing the plurality of pixel values, the method derives (block 208) an actual luminance value for the central pixel. In one embodiment, this luminance value is derived based at least in part upon a combination of the sensed and derived pixel values for the central pixel; thus, the actual luminance value takes into account the pixel values for all of the colors for the central pixel.

Thereafter, the method derives (block 212) an actual chroma value for the central pixel. This chroma value is derived based at least in part upon the sensed pixel value for the central pixel and the actual luminance value for the central pixel. In one embodiment, the actual chroma value is defined as the ratio between the sensed pixel value for the central pixel and the actual luminance value for the central pixel.

In addition to the above operations, the method also generates (block 216) a plurality of luminance values for the matrix of pixels, which includes a luminance value for most if not all of the pixels in the matrix. In one embodiment, the method generates these luminance values by applying a luminance filter to most of the pixels in the matrix. When the luminance filter is applied to a certain pixel in the matrix, it causes a luminance value to be derived for that certain pixel based at least in part upon a combination of the sensed pixel value for that certain pixel (which corresponds to one of the several colors) and the sensed pixel values for a plurality of neighboring pixels that correspond to the other of the several colors. For example, if the certain pixel is of a first color and the neighboring pixels are of a second and third color, the luminance filter will cause the pixel value for the first color (from the certain pixel) to be combined with the pixel values for the other colors (from the neighboring pixels). Thus, the luminance value for a certain pixel takes into account sensed pixel values for all of the various colors.

The method proceeds to apply (block 220) one or more filters to the plurality of pixel values corresponding to the matrix of pixels to derive a filtered pixel value for the central pixel. In one embodiment, the one or more filters take the form of de-noising filter(s). Thus, this operation in effect results in a color-channel-specific de-noised pixel value for the central pixel. In one embodiment, which filter or filters are applied to the plurality of pixel values depends upon the color of the central pixel. If, for example, the CFA used were a Bayer filter and the central pixel were a green pixel, then one set of filters may be used. Otherwise, another set of filter(s) may be used.

The same one or more filters are also applied (block 224) to the plurality of luminance values for the matrix of pixels to derive a filtered luminance value. Since, in one embodiment, the one or more filters are de-noising filters, this operation in effect results in a de-noised luminance value for the central pixel.

After deriving the filtered pixel value and the filtered luminance value for the central pixel, the method derives (block 228) a de-noised chroma value for the central pixel based at least in part upon the filtered pixel value and the filtered luminance value. In one embodiment, the de-noised chroma value is defined as the ratio between the filtered pixel value and the filtered luminance value. At this point, the method has an actual chroma value and a de-noised chroma value for the central pixel.

Based at least in part upon the actual chroma value and the de-noised chroma value, the method derives (block 232) a final chroma value for the central pixel. In one embodiment, the final chroma value may be set to the actual chroma value (resulting in no denoising), the de-noised chroma value (resulting in full de-noising), or another value derived based at least in part upon a combination of the actual chroma value and the de-noised chroma value. In one embodiment, the final chroma value is determined based at least in part upon a set of edge/detail information that indicates whether the central pixel is in an edge or detail portion of the captured image. Specifically, the edge/detail information is used to calculate a threshold value, which is compared to the chroma difference between the de-noised chroma value and the actual chroma value. Depending upon the relationship between the chroma difference and the threshold value, the method sets the final chroma value to be the actual chroma value, the de-noised chroma value, or a value derived based at least in part upon the actual chroma value, the de-noised chroma value, and the threshold value.

After deriving a final chroma value for the central pixel, the method derives (block 236) a final de-noised pixel value for the central pixel. In one embodiment, the final de-noised pixel value is derived based at least in part upon the final chroma value and the actual luminance value for the central pixel. The final de-noised pixel value corresponds to the same color channel as the sensed pixel value for the central pixel. Thus, if the CFA used were a Bayer filter and if the color of the central pixel were blue, then the final de-noised pixel value would correspond to the blue channel. In one embodiment, a high luminance de-noised pixel value and a low luminance de-noised pixel value are derived separately. If a low luminance (i.e. low light) condition is not met, then the final de-noised pixel value is set to be the high luminance de-noised pixel value. If the low luminance condition is met, then the final de-noised pixel value is set to a value that is derived based at least in part upon a combination of the high luminance de-noised pixel value and the low luminance de-noised pixel value.

In the manner described, a final de-noised pixel value is derived for the central pixel. This de-noised pixel value may be provided as the output of the method. As an alternative, the difference between the final de-noised pixel value and the sensed pixel value for the central pixel may be provided as the output of the method. Providing the output as a difference allows other components to simply add this difference to their value for the central pixel. Either way, the central pixel is chromatically de-noised by the end of this process. To de-noise another pixel, another matrix of pixels (representing another portion of the mosaic image) with another central pixel is selected, and the process is repeated. By the end of the iterative process, substantially all of the pixels in the mosaic image will have been chromatically de-noised.

The above discussion provides an overview of the chromatic noise reduction method in accordance with one embodiment of the present invention. To facilitate a complete understanding of the invention, a specific sample embodiment will now be described.

Sample Apparatus

Figure 3:
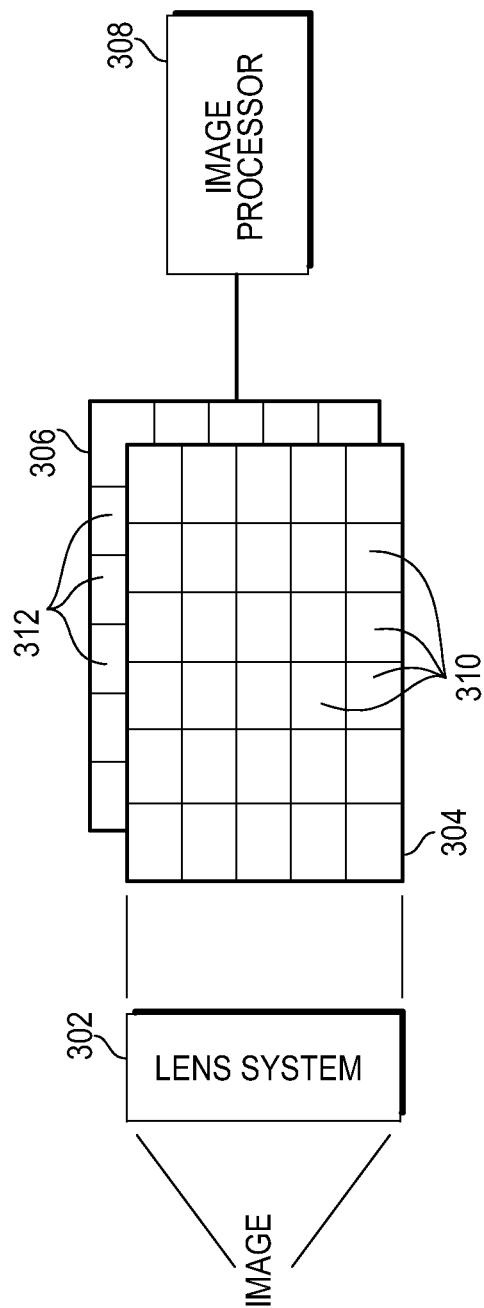
FIG. 3 depicts a possible apparatus in which an embodiment of the present invention may be implemented.

With reference to FIG. 3, there is shown one possible apparatus in which an embodiment of the present invention may be implemented. As shown, the apparatus comprises a lens system 302, a CFA 304, an optical sensor array 306, and an image processor 308.

The lens system 302 receives light from an image to be captured and focuses the light onto the CFA 304. For purposes of the present invention, the lens system 302 may be a simple lens system consisting of just one lens, or it may comprise multiple lenses that work in conjunction with each other. The lens system 302 may be made of any type of suitable lens material, including but not limited to glass and plastic.

The light focused by the lens system 302 is directed at the CFA 304. In one embodiment, the CFA 304 comprises a plurality of filter elements 310 arranged in rows and columns, with each filter element 310 designed to pass light of a particular color. In one embodiment, the CFA 304 takes the form of a Bayer pattern filter that implements the R, G, B color scheme; however, this is not required. For purposes of the present invention, the CFA 304 may be any type of color filter array that uses any set of color filters arranged in any desired pattern.

The light passed through the CFA 304 is detected by the optical sensor array 306. In one embodiment, the optical sensor array 306 comprises a plurality of optical sensor elements 312 arranged in rows and columns that correspond to the rows and columns of filter elements 310 of the CFA 304. Thus, each sensor element 312 is overlaid by a corresponding filter element 310. For purposes of the present invention, the sensor elements 312 may be implemented with any known technology including, but not limited to, charge coupled devices (CCDs) and CMOS sensors.

Together, the CFA 304 and the optical sensor array 306 operate to capture a mosaic image. Specifically, in response to detecting light passed through a corresponding filter element 310, each sensor element 312 provides an output value. This output value indicates the amount of light that was detected by that sensor element 312. Since each sensor element 312 (because of the CFA 304) detects light of only one color, this output value will reflect the intensity of just that color. Thus, the output values provided by the entire array of optical sensors 306 will be a collection of single color values (referred to herein as sensed pixel values), each of which reflects the intensity of just one of several possible colors. As a result, the output of the optical sensor array 306 is a mosaiced version of the original image, referred to herein as a mosaic image. In one embodiment, each optical sensor element 312 represents one of the pixels of the image. This means that, for its corresponding pixel, each optical sensor element 312 provides a color value (a sensed pixel value) for just one of the colors needed to reconstruct that pixel.

The sensed pixel values provided by the optical sensor array 306 are received by the image processor 308. In turn, the image processor 308 may perform any desired operations on the sensed pixel values to enhance the pixel values and to reconstruct a full color image from the pixel values. In one embodiment, it is the image processor 308 that implements the chromatic noise reduction method described herein. In addition to de-noising, the image processor 308 may also perform a variety of other image processing functions including, but certainly not limited to, demosaicing, chromatic aberration correction, green balancing, etc. For the sake of simplicity, image processor 308 is shown as a single component. However, it should be noted that image processor 308 may be made up of any number of components, and the various components may be interconnected in any desired manner to interact with each other.

For purposes of the present invention, the image processor 308 may be implemented using any known technology. For example, the image processor 308 may be hardware implemented using a device (e.g. a programmable logic array) having a plurality of elements, including logical elements, wherein the elements are programmed/configured to implement the method described herein. As an alternative, the image processor 308 may be hardware implemented by way of another device such as an application specific integrated circuit (ASIC) having elements, including logical elements, that are constructed/configured to implement the method described herein. As a further alternative, the image processor 308 may be software implemented such that the method described herein is set forth in a set of instructions that are stored in a machine readable storage medium and executed by one or more computing devices (such as the sample computer system shown in FIG. 11) to carry out the method described herein. These and other implementations are possible. All possible implementations are within the scope of the present invention.

Specific Example of Chromatic Noise Reduction Method

To illustrate how the method in accordance with one embodiment of the present invention may be applied to achieve chromatic noise reduction, a specific example will now be described. In the following example, it will be assumed for the sake of illustration that a Bayer filter implementing the RGB color scheme is used as the CFA 304 to capture a mosaic image, and that it is the mosaic image that is being chromatically de-noised by the image processor 308. It should be noted that the use of a Bayer filter is not required; if so desired, other CFAs implementing other color schemes may also be used to capture the mosaic image.

Chromatically De-Noising an Overall Mosaic Image

Figure 4:
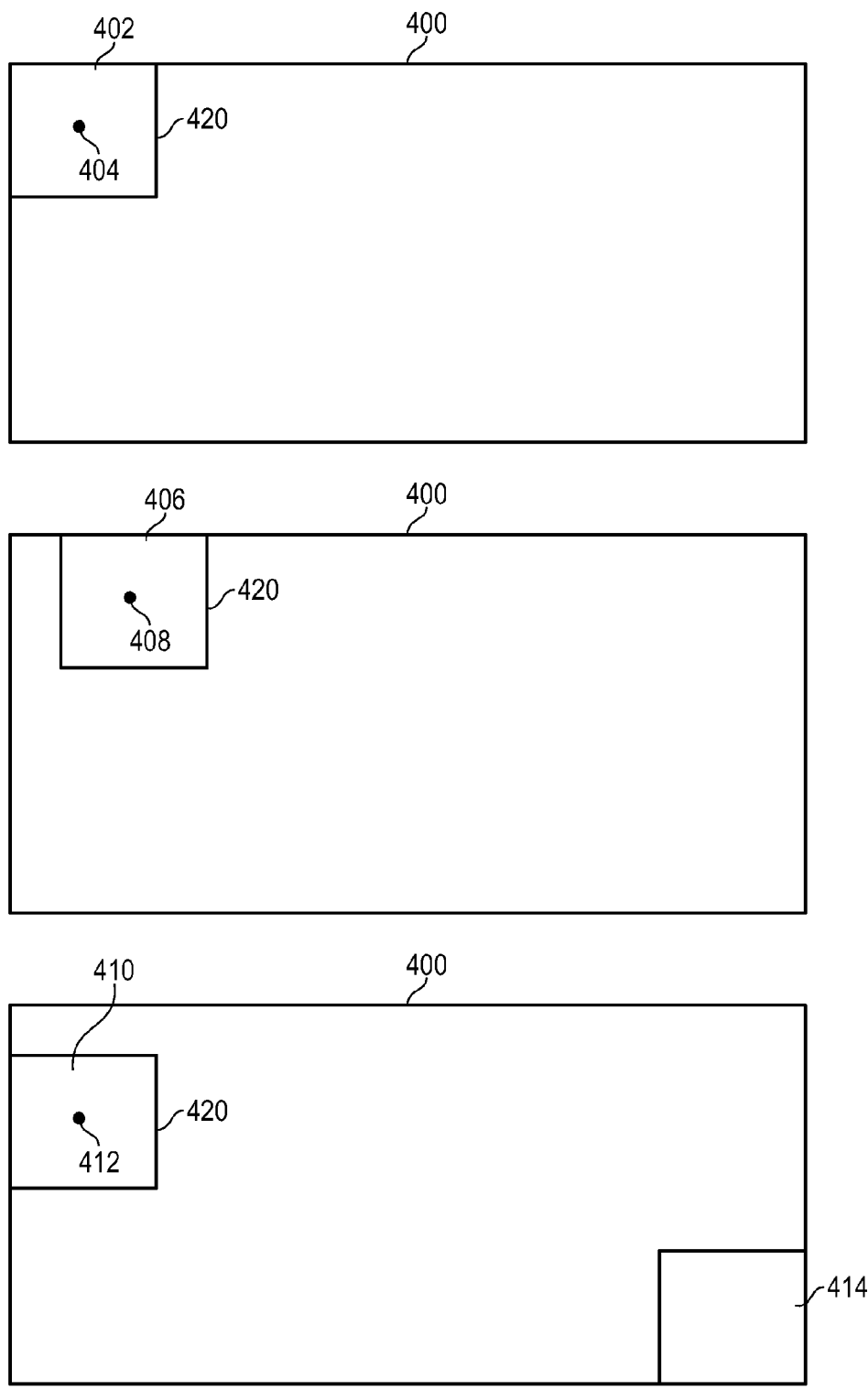
FIG. 4 depicts how a window is moved from image portion to image portion to derive chromatically de-noised pixel values for the pixels in a mosaic image, in accordance with one embodiment of the present invention.

In one embodiment, the image processor 308 chromatically de-noises a mosaic image by processing a selected portion of the mosaic image at a time. This is shown in FIG. 4. The portion of the overall mosaic image 400 that is currently being processed is defined by a window 420. In one embodiment, this window 420 encompasses a 9×9 matrix of pixels (note: 9×9 is used just as an example; other dimensions (e.g. 8×8, 7×9, etc.) may be used if so desired). Initially, the image processor 308 positions the window 420 in the uppermost left corner of the mosaic image 400. This causes a first image portion 402 to be selected. This image portion 402 has a corresponding central pixel 404. The image processor 308 processes the pixels in the selected image portion 402 to derive a chromatically de-noised pixel value for the central pixel 404. The image processor 308 then shifts the window 420 one pixel to the right to give rise to another image portion 406 having another corresponding central pixel 408. The image processor 308 processes the pixels in this image portion 406 to derive a chromatically de-noised pixel value for the central pixel 408. The image processor 308 continues this process of shifting the window 420 one pixel to the right and deriving a de-noised pixel value for a central pixel until the window 420 reaches the end of the row. At that point, the image processor 308 shifts the window 420 back to the left and down one pixel to give rise to another image portion 410 having another corresponding central pixel 412. The image processor 308 processes the pixels in this image portion 410 to derive a de-noised pixel value for the central pixel 412. The image processor 308 continues this process of shifting the window 420 to the right and then down until the window 420 eventually reaches the image portion 414 in the lowermost right corner of the mosaic image 400. At that point, the image processor 308 will have derived a de-noised pixel value for all of the pixels in the mosaic image 400 except for the relatively few pixels along the top, bottom, and side edges. In this manner, the mosaic image 400 is chromatically de-noised.

Chromatically De-Noising a Central Pixel in a Matrix of Pixels

Figure 5:
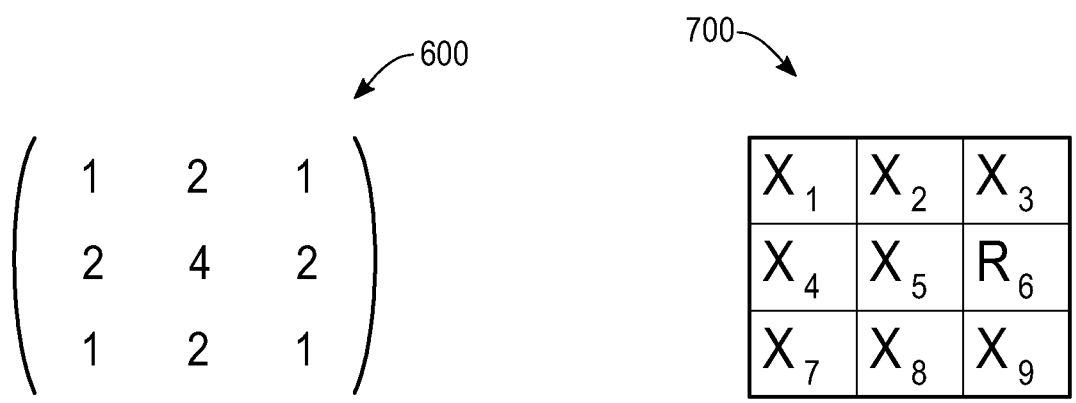
FIG. 5 depicts a matrix of pixels that may be processed to derive a chromatically de-noised pixel value for a central pixel, in accordance with one embodiment of the present invention.

The following discussion describes how a central pixel may be chromatically de-noised once the window 420 has been positioned and an image portion (comprising a matrix of pixels) has been selected. To facilitate discussion, the matrix of pixels (which is a 9×9 matrix in the current example) encompassed by window 420 is shown in FIG. 5, wherein the 81 pixels are numbered in order from left to right and from top to bottom. The central pixel of the matrix is pixel 41. Since the matrix shown in FIG. 5 represents any possible matrix of pixels encompassed by the window 420, the central pixel may be a R, G, or B pixel.

To chromatically de-noise the central pixel, the image processor 308 initially accesses the sensed pixel values for all of the pixels in the matrix. These sensed pixel values are provided by the optical sensor array 306, and each sensed pixel value provides a value for just one of the three colors. For the central pixel, in addition to accessing the sensed pixel value corresponding to one of the three colors, the image processor 308 also accesses two derived pixel values corresponding to the other two colors for the central pixel. These derived pixel values may be derived through a demosaicing process, which may be performed by the image processor 308 as part of the de-noising process or by another component. For purposes of the present invention, the central pixel may be demosaiced using any of a variety of known demosaicing techniques. In one embodiment, the central pixel is the only pixel in the matrix that needs to be demosaiced. By not requiring the other pixels in the matrix to be demosaiced, the method of the present inventions simplifies processing, which in turn increases efficiency and reduces gate count (in the event the image processor 308 is implemented in hardware). For nomenclature purposes, the pixel values for the three colors for the central pixel are designated as $R_{41}$, $G_{41}$, and $B_{41}$ (one of these values is the sensed pixel value received from the optical sensor array 306 and the other two values are the derived pixel values).

Using the sensed and derived pixel values for the central pixel, the image processor 308 proceeds to derive an actual luminance value, $Y_{actual}$, for the central pixel. In one embodiment, $Y_{actual}$ is Y derived using the following equation:

$$Y_{actual} = (R_{41} + 2G_{41} + B_{41})/4 \qquad \text{Eq. 1}$$

Other equations may be used, if so desired. The significant points regarding equation 1 are: (1) that the ratios between the R, G, and B pixel values are 1R to 2G to 1B; and (2) that the actual luminance value is derived based upon pixel values of more than one color. In equation 1, the actual luminance value is derived based upon the pixel values of all of the different colors; thus, all of the colors are taken into account.

After deriving the actual luminance value for the central pixel, the image processor 308 proceeds to derive an actual chroma value, $C_{actual}$, for the central pixel. In one embodiment, the actual chroma value is defined as the ratio between the sensed pixel value for the central pixel and the actual luminance value for the central pixel, as shown in the following equation:

$$C_{actual} = P_{sensed}/Y_{actual} \qquad \text{Eq. 2}$$

where $P_{sensed}$ is the sensed pixel value for the central pixel. $P_{sensed}$ may be $R_{41}$, $G_{41}$, or $B_{41}$, depending upon whether the central pixel is a red, green, or blue pixel. The image processor 308 now has an actual chroma value for the central pixel, which represents the chroma value of the central pixel before it has been chromatically de-noised.

In one embodiment, after the actual chroma value is derived for the central pixel, the image processor 308 proceeds to derive a de-noised chroma value for the central pixel. In one embodiment, the image processor 308 does so by performing the following operations.

Initially, the image processor 308 generates a luminance matrix for the matrix of pixels. This luminance matrix includes a luminance value for most if not all of the pixels in the matrix of pixels. In one embodiment, the image processor 308 generates the luminance matrix by applying a luminance filter to most of the pixels in the matrix of pixels. Various filters may be used for this purpose, but one particular luminous filter that is used in one embodiment of the present invention is the filter 600 shown in FIG. 6. This filter 600 is designed to be applied to a 3×3 sub matrix of pixels, and the values in the filter 600 represent the weights to be applied to the pixel values of the pixels in the 3×3 sub matrix. For example, suppose that filter 600 is to be applied to the sub matrix 700 shown in FIG. 7, where the pixels have pixel values $X_1$ through $X_9$. In such a case, the "1" weighting factor of the top leftmost element of the filter 600 would be applied to the top leftmost pixel value $X_1$ of the sub matrix 700, the "2" weighting factor of the top center element of the filter 600 would be applied to the top center pixel value $X_2$ of the sub matrix 700, the "1" weighting factor of the top rightmost element of the filter 600 would be applied to the top rightmost pixel value $X_3$ of the sub matrix 700, and so on. Expressed mathematically, application of the filter 600 to sub matrix 700 would yield a Y value as given in the following equation:

$$Y=(1X_1+2X_2+1X_3+2X_4+4X_5+2X_6+1X_7+2X_8+1X_9)/16 \qquad \text{Eq. 3}$$

The total is divided by 16 because 16 is the sum of all of the weights in filter 600. In effect, application of the filter 600 to the sub matrix 700 produces a weighted average of the nine pixel values, with the middle pixel value $X_5$ getting the greatest weight. In a Bayer pattern mosaic image, the nine pixels in the sub matrix 700 will include pixels of all three colors. Thus, the weighted average will reflect pixel values of all three colors.

A significant point to note regarding filter 600 is that, regardless of what color the middle pixel of the sub matrix 700 is, the ratio of R values to G values to B values stays the same, namely 1R to 2G to 1B. For example, if the middle pixel value $X_5$ is a red (R) pixel value, then the pixel values X2, X4, X6, and X8 will be green (G) pixel values, and the pixel values X1, X3, X7, and X9 will be blue (B) pixel values. Applying the weights in filter 600 to these pixel values will yield 4 times R, 8 times G, and 4 times B, which reduces to a ratio of 1R to 2G to 1B. Similarly, if the middle pixel value $X_5$ is a green (G) pixel value, then the pixel values X2 and X8 will be blue (B) or red (R) pixel values, the pixel values X4 and X6 will be red (R) or blue (B) pixel values, and the pixel values X1, X3, X7, and X9 will be green (G) pixel values. Applying the weights in filter 600 to these pixel values will again yield 4 times R, 8 times G, and 4 times B, which again reduces to a ratio of 1R to 2G to 1B. The same would be true if the middle pixel value $X_5$ is a blue pixel value. Notice that this 1R to 2G to 1B ratio is the same as that used above in deriving the actual luminance value for the central pixel of FIG. 5. Thus, by applying filter 600 to a sub matrix 700, the image processor 308 is in effect deriving a luminance value for the middle pixel of the sub matrix 700. Unlike the central pixel of FIG. 5, this luminance value is not derived based upon the different color values of the same pixel. Rather, it is derived based upon the sensed pixel value (corresponding to one color) of the middle pixel of the sub matrix 700 and the sensed pixel values (corresponding to the other two colors) of neighboring pixels. Nevertheless, the resulting value is still a luminance value, albeit a somewhat blurred one. Thus, by applying luminance filter 600 to a sub matrix 700, the image processor 308 derives a luminance value for the middle pixel of the sub matrix 700.

In one embodiment, the image processor 308 derives a luminance matrix for the matrix of pixels (FIG. 5) by initially applying filter 600 to the top leftmost 3×3 sub matrix of the matrix of pixels. This sub matrix includes pixels 1, 2, 3, 10, 11, 12, 19, 20, and 21. Doing so allows a luminance value to be derived for pixel 11. The image processor 308 then shifts one pixel to the right and applies the filter 600 to the next 3×3 sub matrix, which includes pixels 2, 3, 4, 11, 12, 13, 20, 21, and 22. This allows a luminance value to be derived for pixel 12. The image processor 308 continues this process of shifting one pixel to the right until a luminance value is derived for pixels 11 through 17. The image processor 308 then shifts back to the left and down one pixel and repeats the process to derive luminance values for pixels 20-26. The image processor 308 repeats this process until all of the luminance values (Y) shown in FIG. 8A are derived. In one embodiment, the image processor 308 operates in pipelined fashion; thus, in addition to the sensed pixel values for pixels 1 through 81, the image processor 308 can also access the sensed pixel values for the column of pixels to the left of the matrix and the column of pixels to the right of the matrix. With these additional sensed pixel values, the image processor 308 can apply the filter 600 to derive luminance values for the leftmost and rightmost pixels of the matrix, as shown in FIG. 8B. This still leaves the top and bottom rows of pixels without luminance values. In one embodiment, this problem is solved by duplicating the luminance values of the second row and using these values for the top row as well, and duplicating the luminance values of the eighth row and using these values for the bottom row as well. The completed luminance matrix is shown in FIG. 8C. In this manner, the image processor 308 generates a 9×9 luminance matrix for the matrix of pixels.

In one embodiment, after the luminance matrix is generated, the image processor 308 proceeds to apply one or more filters to the matrix of pixels (FIG. 5) and to the luminance matrix (FIG. 8C). In one embodiment, which filter or filters are applied depends upon whether the central pixel (pixel 41) of the matrix of pixels is a red, green, or blue pixel. In one embodiment, if the central pixel is a red or a blue pixel, then the filter 902 shown in FIG. 9A is applied. If the central pixel is a green pixel, then the filter 904 shown in FIG. 9B is applied. Notice that the filter 904 is equivalent to filter 902 plus a delta filter 906, as shown in FIG. 9C. Thus, filter 904 may be applied as a single filter or as a combination of filters 902 and 906. It should be noted that these filters 902, 904, 906 are provided merely as examples of filters that may be used. Other filters with different configurations and different weights may be used if so desired. All such filters are within the scope of the present invention. In one embodiment, whichever filter or filters are applied, they are applied to both the matrix of pixels and the luminance matrix. Thus, if the central pixel is a red or a blue pixel, filter 902 is applied to both the matrix of pixels and the luminance matrix. If the central pixel is a green pixel, filter 904 or a combination of filters 902 and 906 is applied to both the matrix of pixels and the luminance matrix.

Given the arrangement of the weights of filters 902 and 904, the filters in effect implement a color-channel-specific de-noising function. For example, notice that all of the non-zero weights in filter 902 are assigned to pixels that are the same color as the central pixel (which is either red or blue). The same is true for filter 904, for which the central pixel is green. Thus, only the pixel values of pixels that are the same color as the central pixel are taken into consideration. Hence, when filter 902 or filter 904 is applied to the matrix of pixels, what is obtained is a color-channel-specific de-noised pixel value for the central pixel (referred to hereinafter as the filtered pixel value for the central pixel). Similarly, when the same filter is applied to the luminance matrix, what is obtained is a color-channel-specific de-noised luminance value for the central pixel (referred to herein as the filtered luminance value for the central pixel).

Filters 902, 904, and 906 may be applied to the matrix of pixels and the luminance matrix in a manner similar to that with which filter 600 of FIG. 6 was applied to the sub matrix of FIG. 7. Expressed mathematically, application of filter 902 to the matrix of pixels (FIG. 5) gives rise to a filtered pixel value, $P_{filtered}$, that is derived as follows:

$$P_{filtered}=(\Sigma_n WRB_n * P_n)/32 \qquad \text{Eq. 4}$$

where n is an integer between 1 and 81, $WRB_n$ is the nth element (or nth weight) of the filter 902, and $P_n$ is the sensed pixel value of the nth pixel in the matrix of pixels. For purposes of this expression, n is a variable that increases in value as a matrix or filter is traversed from left to right and from top to bottom. An example of n can be seen in FIG. 5, where n increases from left to right, row by row, and is used to refer to one of the 81 pixels in the matrix of pixels. Applying this same n scheme to filter 902, the $23^{rd}$ element or weight of the filter 902 would be the "2" that is in the third row, fifth column of the filter 902, and the $37^{th}$ element would be the "1" that is in the fifth row, first column of the filter 902, using these just as examples. Given this convention, equation 4 basically calls for each nth weight of the filter 902 to be multiplied against the sensed pixel value of the corresponding nth pixel of the matrix of pixels, and for all of these results to be summed up and divided by 32 (the sum is divided by 32 because all of the weights of filter 902 add up to 32).

In a similar manner, application of filter 902 to the luminance matrix can be expressed mathematically as follows:

$$Y_{filtered} = (\Sigma_n WRB_n * Y_n)/32 \qquad \text{Eq. 5}$$

where $Y_{filtered}$ is the filtered luminance value for the central pixel and $Y_n$ is the luminance value for the nth element of the luminance matrix. Equation 5 basically calls for each nth weight of the filter 902 to be multiplied against the luminance value of the corresponding nth element of the luminance matrix, and for all of these results to be summed up and divided by 32. As noted above, filter 902 is applied to the matrix of pixels and the luminance matrix if the central pixel of the matrix of pixels is a red or a blue pixel If the central pixel is a green pixel, then filter 904 or a combination of filters 902 and 906 is applied instead. Mathematically, application of filter 904 to the matrix of pixels can be expressed as:

$$P_{filtered} = (\Sigma_n WG_n * P_n)/64 \qquad \text{Eq. 6}$$

where $WG_n$ is the nth element (or nth weight) of the filter 904. Equation 6 basically calls for each nth weight of the filter 904 to be multiplied against the sensed pixel value of the corresponding nth pixel of the matrix of pixels, and for all of these results to be summed up and divided by 64 (the sum is divided by 64 because all of the weights of filter 904 add up to 64).

Similarly, application of filter 904 to the luminance matrix can be expressed mathematically as follows:

$$Y_{filtered} = (\Sigma_n WG_n * Y_n)/64 \qquad \text{Eq. 7}$$

Basically, equation 7 calls for each nth weight of the filter 904 to be multiplied against the luminance value of the corresponding nth element of the luminance matrix, and for all of these results to be summed up and divided by 64.

If, instead of applying filter 904, the image processor 308 applies the combination of filters 902 and 906, then the filtered pixel value, $P_{filtered}$, for the central pixel can be derived as follows:

$$P_{filtered} = ((\Sigma_n WRB_n * P_n) + (\Sigma_n WD_n * P_n))/64 \qquad \text{Eq. 8}$$

where $WD_n$ is the nth element (or nth weight) of the filter 906.

The filtered luminance value, $Y_{filtered}$, can be derived as follows:

$$Y_{filtered} = ((\Sigma_n WRB_n * Y_n) + (\Sigma_n WD_n * Y_n))/64 \qquad \text{Eq. 9}$$

In the manner described above, the filtered pixel value, $P_{filtered}$, and the filtered luminance value, $Y_{filtered}$, for the central pixel of the matrix of pixels can be derived. Once these values are known, the image processor 308 proceeds to derive a de-noised chroma value for the central pixel. In one embodiment, the de-noised chroma value is defined as the ratio between the filtered pixel value, $P_{filtered}$, and the filtered luminance value, $Y_{filtered}$. Thus, the de-noised chroma value, $C_{de-noised}$, can be derived as follows:

$$C_{de-noised} = P_{filtered}/Y_{filtered} \qquad \text{Eq. 10}$$

The image processor 308 now has an actual chroma value (derived previously) and a de-noised chroma value for the central pixel. In one embodiment, based at least in part upon these chroma values, the image processor 308 derives a final chroma value for the central pixel. In one embodiment, the final chroma value may be derived as follows.

Initially, the image processor 308 derives a chroma difference threshold value, chr_thr (the manner in which this threshold value may be derived is described in a later section). The image processor 308 also derives a chroma difference value, $C_{diff}$, which is defined as the difference between the de-noised chroma value for the central pixel and the actual chroma value for the central pixel, as captured by the following equation:

$$C_{diff} = C_{de-noised} - C_{actual} \qquad \text{Eq. 11}$$

If the absolute value of $C_{diff}$ is greater than twice chr_thr, then the image processor 308 sets the final chroma value, $C_{final}$, for the central pixel to be the actual chroma value, $C_{actual}$, (thereby resulting in no chromatic de-noising). If the absolute value of $C_{diff}$ is less than chr_thr, then the image processor 308 sets $C_{final}$ to t be the de-noised chroma value, $C_{de-noised}$. If the absolute value of $C_{diff}$ is between chr_thr and twice chr_thr, then the image processor 308 derives $C_{final}$ as follows:

$$\text{if } C_{diff} > 0, \text{ then } C_{final} = 2*(C_{actual} + \text{chr\_thr}) - C_{de-noised} \qquad \text{Eq. 12}$$

$$\text{if } C_{diff} < 0, \text{ then } C_{final} = 2*(C_{actual} - \text{chr\_thr}) - C_{de-noised} \qquad \text{Eq. 13}$$

$C_{final}$ represents the final chroma value for the central pixel. Given this value, and the actual luminance value, $Y_{actual}$, which was derived previously for the central pixel, the image processor 308 can derive the final de-noised pixel value for the central pixel. In one embodiment, the final de-noised pixel value, $P_{final-de-noised}$, is derived by multiplying the final chroma value, $C_{final}$, and the actual luminance value, $Y_{actual}$, as shown below:

$$P_{final\ de-noised} = C_{final} * Y_{actual} \qquad \text{Eq. 14}$$

The final de-noised pixel value for the central pixel is thus derived. This pixel value corresponds to the same color channel as the sensed pixel value, $P_{sensed}$, for the central pixel. Thus, if the color of the central pixel is blue, then the final de-noised pixel value would correspond to the blue channel. The final de-noised pixel value may be provided as the output of the chromatic noise reduction method. As an alternative, the difference between the final de-noised pixel value, $P_{final\ de-noised}$, and the sensed pixel value, $P_{sensed}$, may be provided as the output of the method. Providing the output as a difference allows other components to simply add this difference to their value for the central pixel.

In the manner described, the central pixel of the matrix of pixels is chromatically de-noised.

Derivation of Chroma Difference Threshold Value

As mentioned above, the final chroma value, $C_{final}$, for the central pixel is derived based at least in part upon the chroma difference threshold value, chr_thr. The following section describes how this threshold value may be derived in accordance with one embodiment of the present invention. As an alternative, chr_thr may be user or system provided.

In one embodiment, the image processor 308 derives chr_thr by initially calculating a first threshold value, chr_thr1, and a second threshold value, chr_thr2. The first threshold value chr_thr1 is calculated using parameters that are suitable for edge areas of an image, while the second threshold value chr_thr2 is calculated using parameters that are suitable for flat/detail areas of an image. As used herein, the term "edge" refers to an area of an image where there is a sharp and sudden change in chroma and/or luminance (e.g. an edge may be an area of an image where the image transitions from a person's face to a house that is in the background). In contrast, the term "flat/detail" refers to an area of an image where there is no change or gradual change in chroma and/or luminance and/or where there are fine details.

In one embodiment, to derive chr_thr1 (which is the edge threshold), the image processor 308 initially determines whether the actual luminance, $Y_{actual}$, of the central pixel is above or below a certain luminance threshold (in one embodiment, this threshold is user provided). If $Y_{actual}$ is above the luminance threshold, then linear approximation is performed using a first set of parameters. Otherwise, linear approximation is performed using a second set of parameters. In one embodiment, this threshold check is performed to detect high luminosity near an edge. At high luminosity levels, saturation may occur. Calculating chr_thr1 with saturated values may lead to nonsensical results. To prevent this from occurring, the image processor 308, in one embodiment, checks for saturation, and uses different parameters to calculate chr_thr1 when saturation is detected. Once the saturation check is performed, the image processor 308 uses the proper parameters (selected in response to the luminance threshold check) and performs a linear approximation based upon the proper parameters and the value of $Y_{actual}$ to derive a value for chr_thr1.

A value for chr_thr2 (which is the flat/details threshold) may also be derived using a linear approximation process. However, unlike for chr_thr1, the image processor 308, in one embodiment, does not perform a luminance threshold check for chr_thr2. Rather, for any value of $Y_{actual}$, the image processor 308 performs a linear approximation process using a set of parameters (which are different from those used to calculate chr_thr1) and $Y_{actual}$ to derive a value for chr_thr2. In the manner described above, chr_thr1 and chr_thr2 may be derived. As an alternative to calculating these two threshold values, the image processor 308 may instead obtain the threshold values from a lookup table or a user, for example.

In addition to deriving chr_thr1 and chr_thr2, the image processor 308 accesses a set of edge/detail information for the central pixel, which provides an indication as to whether the central pixel is in an edge area or a flat/detail area of the captured image. The image processor 308 may generate this edge/detail information itself, or it may receive the information from another component. Edge/detail information may be generated in various ways using different techniques. An example of how edge/detail information may be generated is provided in co-pending U.S. application Ser. No. 12/905,367, filed on Oct. 15, 2010, entitled "Continuous Edge and Detail Mapping Using a Weighted Monotony Measurement", the contents of which are incorporated herein by reference. In one embodiment, the edge/detail information takes the form of an edge/detail value, Edge_Detail, for the central pixel.

In one embodiment, the image processor 308 compares Edge_Detail to an edge threshold value, EDThr, which in one embodiment is a user provided parameter. If Edge_Detail is less than or equal to EDThr (thereby indicating that the central pixel is not near an edge), then the image processor 308 sets an edge_data parameter to 0. On the other hand, if Edge_Detail is greater than EDThr (thereby indicating that the central pixel may be near an edge), then the image processor 308 sets the edge_data parameter as follow:

$$\text{edge\_data} = \text{Edge\_Detail} - \text{EDThr} \qquad \text{Eq. 15}$$

If edge_data is greater than a maximum value, EDmax, then edge_data is clipped and set to EDmax.

Given chr_thr1, chr_thr2, and edge_data, the image processor 308 is ready to derive the chroma difference threshold value, chr_thr. In one embodiment, chr_thr is derived based upon the following equation:

$$\text{chr\_thr} = \text{chr\_thr2} + ((\text{chr\_thr1} - \text{chr\_thr2})*\text{edge\_data})/\text{EDmax} \qquad \text{Eq. 16}$$

Once derived, chr_thr may be used in the manner described above to derive a final chroma value for the central pixel.

Low Luminance

In equations 2 and 10 above, chroma is defined as the ratio between a pixel value for a pixel and a luminance value for that pixel. Notice that the luminance value is in the denominator of both equations. This means that if the luminance value is small (as it will be in areas of the captured image where lighting is low), a very large chroma value can result. It also means that a small error/variation in the luminance value can lead to a large error/variation in the chroma value. As a result, in low light portions of the captured image, the use of equations 2 and 10 may lead to less than optimal results.

This problem may be solved, at least partially, by using logarithms. Specifically, it is well known in mathematics that a multiplication operation in a $Base_n$ domain is equivalent to an addition operation in the $log_n$ domain, and that a division operation in the $Base_n$ domain is equivalent to a subtraction operation in the $log_n$ domain. It is also generally true that for small values of x, $log_n x \approx x$. Thus, in low light situations where the pixel value, luminance value, and chroma value of a pixel will all be small, equations 2 and 10 may be approximated as:

$$C_{actual} = P_{sensed} - Y_{actual} \qquad \text{Eq. 17}$$

and $$C_{de\text{-}noised} = P_{filtered} - Y_{filtered} \qquad \text{Eq. 18}$$

This approximation is exploited in one embodiment of the present invention to provide improved chromatic noise reduction results in low light portions of the captured image.

In one embodiment, the image processor 308 derives a final de-noised pixel value, $P_{final\ de\text{-}noised}$, for the central pixel in the same manner as that described previously. $P_{final\ de\text{-}noised}$ is set as the high light de-noised pixel value, outHL.

The image processor 308 also derives a low light de-noised pixel value, outLL, for the central pixel. In one embodiment, outLL may be derived as follows. Using equations 17 and 18 above, the image processor 308 derives a low light actual chroma value, $C_{actualLL}$, and a low light de-noised chroma value, $C_{de\text{-}noisedLL}$, for the central pixel. Using these values, a low light chroma difference value, $C_{diffLL}$, is derived as follows:

$$C_{diffLL} = C_{de\text{-}noisedLL} - C_{actualLL} \qquad \text{Eq. 19}$$

Based at least in part upon $C_{diffLL}$, $C_{de\text{-}noisedLL}$, and $C_{actualLL}$, the image processor 308 derives a low light final chroma value, $C_{finalLL}$, for the central pixel. Specifically, if the absolute value of $C_{diffLL}$ is greater than twice chr_thr (the chroma difference threshold value derived previously), then the image processor 308 sets the low light final chroma value, $C_{finalLL}$, to be the low light actual chroma value, $C_{actualLL}$. If the absolute value of $C_{diffLL}$ is less than chr_thr, then the image processor 308 sets $C_{finalLL}$ to be the low light de-noised chroma value, $C_{de\text{-}noisedLL}$. If the absolute value of $C_{diffLL}$ is between chr_thr and twice chr-thr, then the image processor 308 derives $C_{finalLL}$ as follows:

$$\text{if } C_{diffLL} > 0, \text{ then } C_{finalLL} = 2*(C_{actualLL} + \text{chr\_thr}) - C_{de\text{-}noisedLL} \qquad \text{Eq. 20}$$

$$\text{if } C_{diffLL} < 0, \text{ then } C_{finalLL} = 2*(C_{actualLL} - \text{chr\_thr}) - C_{de\text{-}noisedLL} \qquad \text{Eq. 21}$$

After $C_{finalLL}$ is derived, the image processor 308 uses it to derive the low light de-noised pixel value, outLL, for the central pixel, as shown in the following equation:

$$\text{out}LL = Y_{actual} + C_{finalLL} \qquad \text{Eq. 22}$$

The image processor 308 now has a high light de-noised pixel value, outHL, and a low light de-noised pixel value, outLL, for the central pixel. The image processor 308 thereafter determines how to use these values to derive a final de-noised pixel value for the central pixel.

In one embodiment, the image processor 308 performs an initial check to determine whether low light optimization is desired (in one embodiment, this is a user specified parameter). If low light optimization is not desired, then the image processor 308 simply uses the high light de-noised pixel value, outHL, as the final-denoised pixel value for the central pixel.

However, if low light optimization is desired, then the image processor 308 performs the following operations, in accordance with one embodiment of the present invention. Initially, the image processor 308 calculates a value for a Y_ll_test parameter. To do so, the image processor 308 determines whether the actual luminance value, $Y_{actual}$, for the central pixel is less than a first threshold value, Y_ll_thr (which, in one embodiment, is user provided). If so, then:

$$Y\_ll\_test = 2^{Y\_ll\_shift} \qquad \text{Eq. 23}$$

where Y_ll_shift is a user defined parameter which, in one embodiment, is defined to be 5. On the other hand, if $Y_{actual}$ is greater than or equal to Y_ll_thr, then:

$$Y\_ll\_test = 2^{Y\_ll\_shift} - \text{floor}\{(Y_{actual} - Y\_ll\_thr) * Y\_ll\_slope/2^{Y\_ll\_shift}\} \qquad \text{Eq. 24}$$

where Y_ll_slope is a user provided parameter. If Y_ll_test is negative, it is clipped to zero. The Y_ll_test parameter is thus calculated.

The image processor 308 also calculates a value for an fY_ll_test parameter. To do so, the image processor 308 determines whether a filtered luminance value, $Y_{RB}$, is less than a second threshold value, fY_ll_thr (which, in one embodiment, is user provided). In this context, $Y_{RB}$ represents the result of applying filter 902 (FIG. 9A) to the luminance matrix (FIG. 8C). If $Y_{RB}$ is less than fY_ll_thr, then:

$$fY\_ll\_test = 2^{Y\_ll\_shift} \qquad \text{Eq. 25}$$

On the other hand, if $Y_{RB}$ is greater than or equal to fY_ll_thr, then:

$$fY\_ll\_test = 2^{Y\_ll\_shift} - \text{floor}\{(Y_{RB} - fY\_ll\_thr) * fY\_ll\_slope/2^{Y\_ll\_shift}\} \qquad \text{Eq. 26}$$

where fY_ll_slope is a user provided parameter. If fY_ll_test is negative, it is clipped to zero. The fY_ll_test parameter is thus calculated.

Using Y_ll_test and fY_ll_test, the image processor 308 derives a final test parameter, $T_{final}$, as follows:

$$T_{final} = \text{round}\{Y\_ll\_test * fY\_ll\_test/2^{Y\_ll\_shift}\} \qquad \text{Eq. 27}$$

This final test parameter is used to derive a final de-noised pixel value for the central pixel as follows:

$$P_{final\ de\text{-}noised} = \text{out}HL + \text{round}\{(\text{out}LL - \text{out}HL) * T_{final}/2^{Y\_ll\_shift}\} \qquad \text{Eq. 28}$$

The final de-noised pixel value is thus derived for the central pixel when low light optimization is desired.

Sample Mobile Communication Device

The apparatus of FIG. 3 may be incorporated into a variety of devices to enable those devices to have image capturing and processing capability. These devices may include, for example, mobile communication devices (e.g. cellular phones, smart phones, etc.), personal digital assistants, audio/video capture devices (e.g. cameras, video recorders, etc.), as well as a myriad of other devices. An example of a mobile communication device in which the apparatus of FIG. 3 may be incorporated is shown in FIG. 10.

Figure 10:
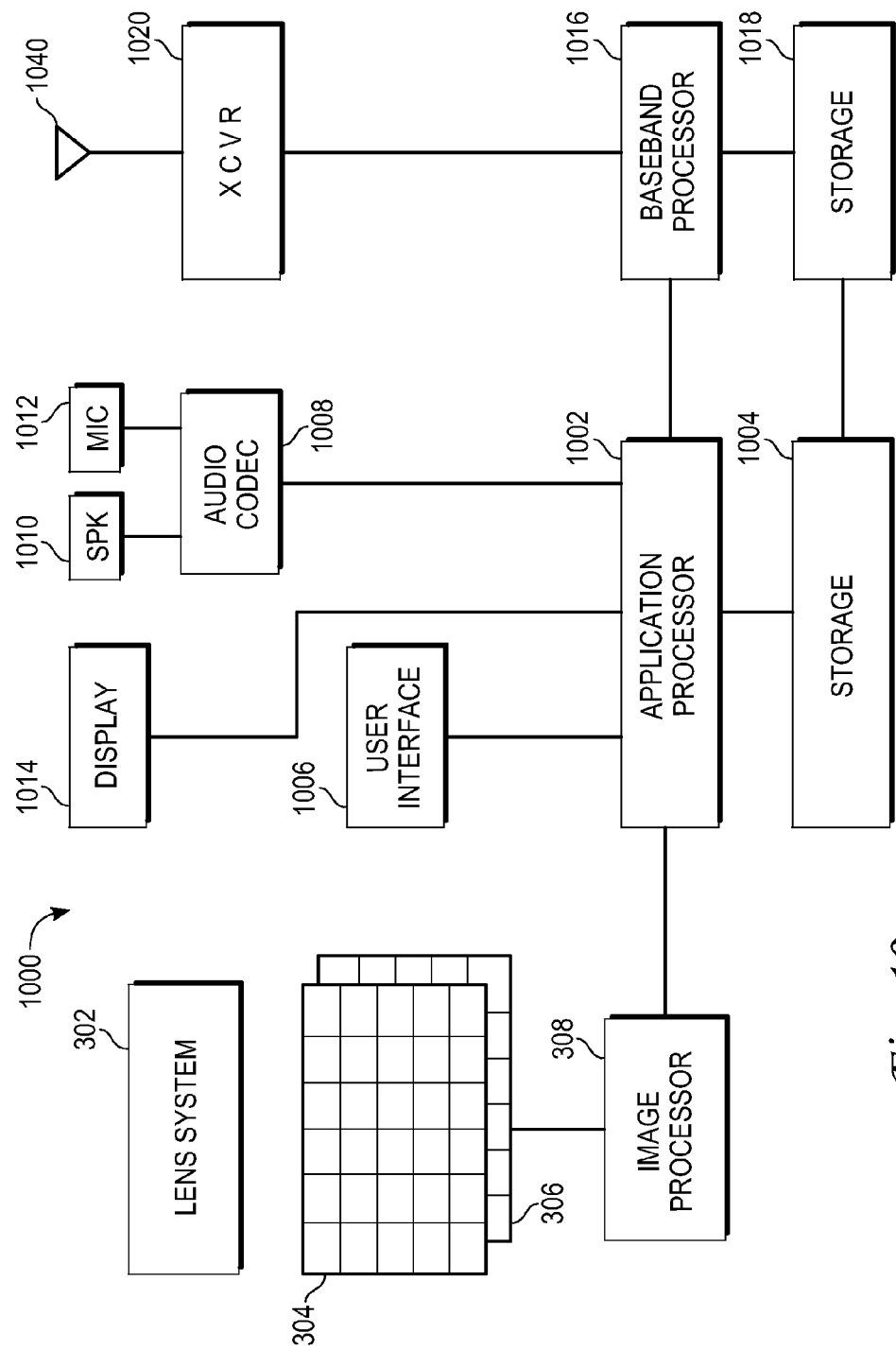
FIG. 10 is a block diagram of a sample mobile communication device in which one embodiment of the present invention may be implemented.

In addition to lens system 302, CFA 304, optical sensor array 306, and image processor 308, the mobile communication device 600 of FIG. 10 further comprises an application processor 1002, which is coupled to the image processor 308. The application processor 1002 is further coupled to various other components, including storage 1004, user interface 1006, display 1014, and audio codec 1008. In one embodiment, it is the application processor 1002 that provides most of the non-wireless communication functionality of the device 1000. In performing its functions, the application processor 1002 executes one or more programs (not shown) stored in storage 1004. These programs may include an operating system, which is executed by application processor 1002 to provide the basic functions required by the hardware and software components of the device 1000. These programs may further include other programs (e.g. games, tools, social networking programs, utilities, navigation programs, browsing programs, etc.) that enable the application processor 1002 to provide additional functionality. Storage 1004 may store any type of program to enable the application processor 1002 to provide any type of functionality. In addition to storing programs, the storage 1004 may also be used by the application processor 1002 to store temporary information/data that is used by the application processor 1002 during program execution.

During operation, the application processor 1002 interacts with the user interface 1006 to receive input from a user. The user interface 1006 may include, for example, a touch sensitive screen, a cursor control device, a keyboard/keypad (physical or virtual), and various other devices that allow the user to provide input. To provide visual output to the user, the application processor 1002 is coupled to the display 1014. Display 1014 may be an LCD screen, an LED screen, or any other type of display that allows the user to view visual output in the form of text, web pages, video, etc.

The application processor 1002 is also coupled to the audio codec 1008 to enable the user to provide audio input to the device 1000 and to enable the application processor to provide audio output to the user. The audio codec 1008 receives analog audio input from the user through microphone 1012 and transforms the analog audio input into digital audio signals that can be processed by the application processor 1002. In addition, the codec receives digital audio signals from the application processor 1002 and transforms them into analog audio signals that can be played by the speaker 1010 to the user.

The application processor 1002 may further be coupled to a baseband processor 1016, which in turn is coupled to a second storage 1018 and a transceiver 1020. In one embodiment, the baseband processor 1016 is responsible for performing most of the wireless communication functions of the mobile communication device 1000. In doing so, the baseband processor 1016 executes one or more programs (not shown) stored in the second storage 1018. These programs may include an operating system (which may be the same or different operating system as that executed by the application processor 1002), programs for processing incoming communication signals, program for processing outgoing communication signals, and various other programs. In addition to storing programs, the storage 1018 may also be used by the baseband processor 1016 to store temporary information/data that is used by the baseband processor 1016 during program execution.

In processing wireless communication signals, the baseband processor 1016 interacts with the transceiver 1020. The transceiver 1020 receives incoming wireless communication signals through antenna 1040 and transforms them into digital signals that can be processed by the baseband processor 1016. In addition, the transceiver 1020 receives digital signals from the baseband processor 1016 and transforms them into signals that can be sent out wirelessly through antenna 1040.

In wireless communication device 1000, the application processor 1002 acts as the central interface for integrating the image processor 308 and the baseband processor 1016 with the other components in the device 1000. For example, the application processor 1002 receives the image information processed by the image processor 308 and allows it to be displayed on display 1014. The application processor 1002 also allows the image information to be stored in storage 1004. In addition, the application processor 1002 receives digital communication signals from the baseband processor 1016 and allows it to be sent to the speaker 1010 to be played to the user. Furthermore, the application processor 1002 allows audio input provided by the user through microphone 1012 to be sent to the baseband processor 1016 for further processing and subsequent transmission.

In previous discussion, it was stated that, in one embodiment, it is the image processor 308 that implements the method described herein. It should be noted that this is just one possible embodiment. As alternative embodiments, the method disclosed herein may be implemented: (1) entirely by the application processor 1002; (2) partially by the image processor 308 and partially by the application processor 1002; or (3) partially by the image processor 308, partially by the application processor 1002, and partially by the baseband processor 1016. These and other implementations are possible. All such implementations are within the scope of the present invention.

Sample Computing Device

Figure 11:
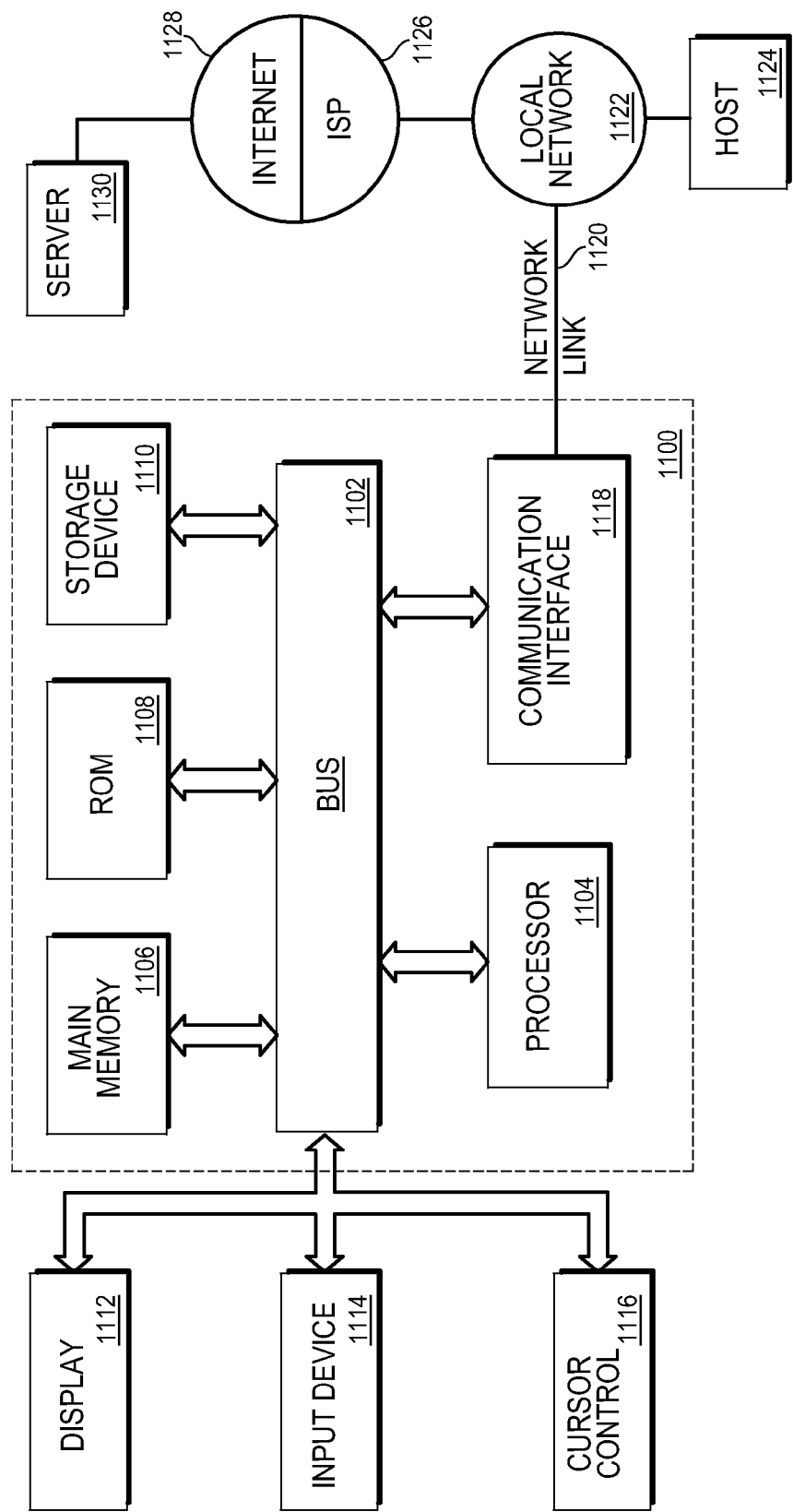
FIG. 11 is a block diagram of a sample computer system in which one embodiment of the present invention may be implemented.

FIG. 11 shows a block diagram of a computer system 1100 in which a software implementation of the present invention may be implemented. Computer system 1100 includes a bus 1102 for facilitating information exchange, and one or more processors 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions by processor 1104. Computer system 1100 may further include a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112 for displaying information to a computer user. One or more input devices 1114 may also be coupled to bus 1102 for communicating information and input to processor 1104. An input device 1114 may be a keyboard/keypad having alphanumeric and other keys. An input device 1114 may also be the apparatus 100 shown in FIG. 1 for providing captured/processed image information to processor 1104. A cursor control device 1116, such as a mouse, a trackball, or cursor direction keys may also be coupled to bus 1102 for communicating direction information and command selections to processor 1104 and for controlling cursor movement on display 1112. This cursor control device typically has two degrees of freedom in two axes, a first axis (e.g., x) and a second axis (e.g., y), that allows the device to specify positions in a plane.

In computer system 1100, bus 1102 may be any mechanism and/or medium that enables information, signals, data, etc., to be exchanged between the various components. For example, bus 1102 may be a set of conductors that carries electrical signals. Bus 1102 may also be a wireless medium (e.g. air) that carries wireless signals between one or more of the components. Bus 1102 may further be a network connection that connects one or more of the components. Any mechanism and/or medium that enables information, signals, data, etc., to be exchanged between the various components may be used as bus 1102.

Bus 1102 may also be a combination of these mechanisms/media. For example, processor 1104 may communicate with storage device 1110 wirelessly. In such a case, the bus 1102, from the standpoint of processor 1104 and storage device 1110, would be a wireless medium, such as air. Further, processor 1104 may communicate with ROM 1108 capacitively. Further, processor 1104 may communicate with main memory 1106 via a network connection. In this case, the bus 1102 would be the network connection. Further, processor 1104 may communicate with display 1112 via a set of conductors. In this instance, the bus 1102 would be the set of conductors. Thus, depending upon how the various components communicate with each other, bus 1102 may take on different forms. Bus 1102, as shown in FIG. 11, functionally represents all of the mechanisms and/or media that enable information, signals, data, etc., to be exchanged between the various components.

An embodiment of the invention uses computer system 1100 for implementing the technique described herein. According to one embodiment of the invention, those techniques are performed by computer system 1100 in response to processor 1104 executing one or more sequences of one or more instructions contained in main memory 1106. Such instructions may be read into main memory 1106 from another machine-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable storage medium" as used herein refers to any storage medium that participates in providing data that causes a machine to operation in a specific fashion. In an embodiment implemented using computer system 1100, various machine-readable storage media are involved, for example, in providing instructions to processor 1104 for execution. Such a medium may take many forms, including but not limited to, non-volatile media and volatile media. Non-volatile media includes, for example, optical or magnetic disks, such as storage device 1110. Volatile media includes dynamic memory, such as main memory 1106.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other storage medium from which a computer can read.

Various forms of machine-readable storage media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution. In this manner, computer system 1100 may obtain application code in the form of a carrier wave.

In the above description, certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

In the foregoing specification, embodiments of the invention have been described with reference to numerous specific details that may vary from implementation to implementation. Thus, the sole and exclusive indicator of what is the invention, and is intended by the Applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A device having a plurality of elements, including logic elements, wherein the elements are configured to perform the following operations:

accessing a plurality of pixel values corresponding to a matrix of pixels representing a portion of a mosaic image, wherein each pixel in the matrix of pixels has a corresponding pixel value that represents an intensity value for one of several predetermined colors, and wherein the matrix of pixels comprises a demosaiced central pixel having a sensed pixel value for one of the several colors and one or more derived pixel values for the other of the several colors;

deriving an actual luminance value for the central pixel;

deriving an actual chroma value for the central pixel based at least in part upon the sensed pixel value and the actual luminance value;

generating a plurality of luminance values for the matrix of pixels which includes a luminance value for at least most of the pixels in the matrix of pixels;

applying one or more filters to the plurality of pixel values to derive a filtered pixel value for the central pixel;

applying the same one or more filters to the plurality of luminance values to derive a filtered luminance value;

deriving a de-noised chroma value for the central pixel based at least in part upon the filtered pixel value and the filtered luminance value;

deriving a final chroma value for the central pixel based at least in part upon the actual chroma value and the de-noised chroma value; and deriving a de-noised pixel value for the central pixel based at least in part upon the final chroma value and the actual luminance value.

2. The device of claim 1, wherein the actual luminance value for the central pixel is derived based at least in part upon a combination of the sensed pixel value and the one or more derived pixel values.

3. The device of claim 2, wherein generating a plurality of luminance values for the matrix of pixels comprises:

selecting a certain pixel in the matrix of pixels, wherein the certain pixel has a pixel value for a first color of the several predetermined colors, wherein the certain pixel has a first set of one or more neighboring pixels each having a pixel value for a second color of the several predetermined colors, and wherein the certain pixel has a second set of one or more neighboring pixels each having a pixel value for a third color of the several predetermined colors; and deriving a luminance value for the certain pixel based at least in part upon a combination of the pixel value of the certain pixel, the pixel values of the first set of neighboring pixels, and the pixel values of the second set of neighboring pixels.

4. The device of claim 3, wherein the actual chroma value is defined as the ratio between the sensed pixel value and the actual luminance value, and wherein the de-noised chroma value is defined as the ratio between the filtered pixel value and the filtered luminance value.

5. The device of claim 1, wherein the central pixel is the only pixel in the matrix of pixels that is required to be demosaiced.

6. The device of claim 1, wherein the several predetermined colors are red, blue, and green, and wherein the pixels in the matrix of pixels are arranged in a Bayer pattern to form the portion of the mosaic image.

7. The device of claim 6, wherein applying one or more filters to the plurality of pixel values comprises:
    applying a first set of one or more filters to the plurality of pixel values if the sensed pixel value for the central pixel is for the red or blue colors; and
    applying a second and different set of one or more filters to the plurality of pixel values if the sensed pixel value for the central pixel is for the green color.

8. The device of claim 7, wherein applying the same one or more filters to the plurality of luminance values comprises:
    applying the first set of one or more filters to the plurality of luminance values if the sensed pixel value for the central pixel is for the red or blue colors; and
    applying the second set of one or more filters to the plurality of luminance values if the sensed pixel value for the central pixel is for the green color.

9. The device of claim 1, wherein deriving a final chroma value for the central pixel comprises:
    accessing a set of edge/detail information indicating whether the central pixel is situated at or near an edge;
    deriving a difference threshold based at least in part upon the edge/detail information;
    deriving a chroma difference between the de-noised chroma value and the actual chroma value; and
    deriving a final chroma value for the central pixel based at least in part upon the difference threshold, the chroma difference, the de-noised chroma value and the actual chroma value.

10. The device of claim 9, wherein deriving a final chroma value for the central pixel based at least in part upon the difference threshold, the chroma difference, the de-noised chroma value and the actual chroma value comprises:
    if the absolute value of the chroma difference is greater than twice the difference threshold, setting the final chroma value to be the actual chroma value;
    if the absolute value of the chroma difference is less than the difference threshold, setting the final chroma value to be the de-noised chroma value; and
    if the absolute value of the chroma difference is between the difference threshold and twice the difference threshold, deriving the final chroma value based at least in part upon the actual chroma value, the de-noised chroma value, and the difference threshold.

11. The device of claim 1, wherein deriving a de-noised pixel value for the central pixel comprises:
    deriving a high luminance de-noised pixel value for the central pixel based at least in part upon the actual luminance value and the final chroma value;
    deriving a low luminance de-noised pixel value for the central pixel based at least in part upon the actual luminance value and the final chroma value; and
    deriving a final de-noised pixel value for the central pixel based at least in part upon the high luminance de-noised pixel value and the low luminance de-noised pixel value.

12. The device of claim 1, wherein the device is a mobile communication device.

13. A non-transitory machine readable storage medium storing instructions which, when executed by one or more processors, cause the one or more processors to perform the following operations:
    accessing a plurality of pixel values corresponding to a matrix of pixels representing a portion of a mosaic image, wherein each pixel in the matrix of pixels has a corresponding pixel value that represents an intensity value for one of several predetermined colors, and wherein the matrix of pixels comprises a demosaiced central pixel having a sensed pixel value for one of the several colors and one or more derived pixel values for the other of the several colors;
    deriving an actual luminance value for the central pixel;
    deriving an actual chroma value for the central pixel based at least in part upon the sensed pixel value and the actual luminance value;
    generating a plurality of luminance values for the matrix of pixels which includes a luminance value for at least most of the pixels in the matrix of pixels;
    applying one or more filters to the plurality of pixel values to derive a filtered pixel value for the central pixel;
    applying the same one or more filters to the plurality of luminance values to derive a filtered luminance value;
    deriving a de-noised chroma value for the central pixel based at least in part upon the filtered pixel value and the filtered luminance value;
    deriving a final chroma value for the central pixel based at least in part upon the actual chroma value and the de-noised chroma value; and
    deriving a de-noised pixel value for the central pixel based at least in part upon the final chroma value and the actual luminance value.

14. The non-transitory machine readable storage medium of claim 13, wherein the actual luminance value for the central pixel is derived based at least in part upon a combination of the sensed pixel value and the one or more derived pixel values.

15. The non-transitory machine readable storage medium of claim 14, wherein generating a plurality of luminance values for the matrix of pixels comprises:
    selecting a certain pixel in the matrix of pixels, wherein the certain pixel has a pixel value for a first color of the several predetermined colors, wherein the certain pixel has a first set of one or more neighboring pixels each having a pixel value for a second color of the several predetermined colors, and wherein the certain pixel has a second set of one or more neighboring pixels each having a pixel value for a third color of the several predetermined colors; and
    deriving a luminance value for the certain pixel based at least in part upon a combination of the pixel value of the certain pixel, the pixel values of the first set of neighboring pixels, and the pixel values of the second set of neighboring pixels.

16. The non-transitory machine readable storage medium of claim 15, wherein the actual chroma value is defined as the ratio between the sensed pixel value and the actual luminance value, and wherein the de-noised chroma value is defined as the ratio between the filtered pixel value and the filtered luminance value.

17. The non-transitory machine readable storage medium of claim 13, wherein the central pixel is the only pixel in the matrix of pixels that is required to be demosaiced.

18. The non-transitory machine readable storage medium of claim 13, wherein the several predetermined colors are red, blue, and green, and wherein the pixels in the matrix of pixels are arranged in a Bayer pattern to form the portion of the mosaic image.

19. The non-transitory machine readable storage medium of claim 18, wherein applying one or more filters to the plurality of pixel values comprises:
 applying a first set of one or more filters to the plurality of pixel values if the sensed pixel value for the central pixel is for the red or blue colors; and
 applying a second and different set of one or more filters to the plurality of pixel values if the sensed pixel value for the central pixel is for the green color.

20. The non-transitory machine readable storage medium of claim 19, wherein applying the same one or more filters to the plurality of luminance values comprises:
 applying the first set of one or more filters to the plurality of luminance values if the sensed pixel value for the central pixel is for the red or blue colors; and
 applying the second set of one or more filters to the plurality of luminance values if the sensed pixel value for the central pixel is for the green color.

21. The non-transitory machine readable storage medium of claim 13, wherein deriving a final chroma value for the central pixel comprises:
 accessing a set of edge/detail information indicating whether the central pixel is situated at or near an edge;
 deriving a difference threshold based at least in part upon the edge/detail information;
 deriving a chroma difference between the de-noised chroma value and the actual chroma value; and
 deriving a final chroma value for the central pixel based at least in part upon the difference threshold, the chroma difference, the de-noised chroma value and the actual chroma value.

22. The non-transitory machine readable storage medium of claim 21, wherein deriving a final chroma value for the central pixel based at least in part upon the difference threshold, the chroma difference, the de-noised chroma value and the actual chroma value comprises:
 if the absolute value of the chroma difference is greater than twice the difference threshold, setting the final chroma value to be the actual chroma value;
 if the absolute value of the chroma difference is less than the difference threshold, setting the final chroma value to be the de-noised chroma value; and
 if the absolute value of the chroma difference is between the difference threshold and twice the difference threshold, deriving the final chroma value based at least in part upon the actual chroma value, the de-noised chroma value, and the difference threshold.

23. The non-transitory machine readable storage medium of claim 13, wherein deriving a de-noised pixel value for the central pixel comprises:
 deriving a high luminance de-noised pixel value for the central pixel based at least in part upon the actual luminance value and the final chroma value;
 deriving a low luminance de-noised pixel value for the central pixel based at least in part upon the actual luminance value and the final chroma value; and
 deriving a final de-noised pixel value for the central pixel based at least in part upon the high luminance de-noised pixel value and the low luminance de-noised pixel value.

24. A machine implemented method, comprising:
 accessing a plurality of pixel values corresponding to a matrix of pixels representing a portion of a mosaic image, wherein each pixel in the matrix of pixels has a corresponding pixel value that represents an intensity value for one of several predetermined colors, and wherein the matrix of pixels comprises a demosaiced central pixel having a sensed pixel value for one of the several colors and one or more derived pixel values for the other of the several colors;
 deriving an actual luminance value for the central pixel;
 deriving an actual chroma value for the central pixel based at least in part upon the sensed pixel value and the actual luminance value;
 generating a plurality of luminance values for the matrix of pixels which includes a luminance value for at least most of the pixels in the matrix of pixels;
 applying one or more filters to the plurality of pixel values to derive a filtered pixel value for the central pixel;
 applying the same one or more filters to the plurality of luminance values to derive a filtered luminance value;
 deriving a de-noised chroma value for the central pixel based at least in part upon the filtered pixel value and the filtered luminance value;
 deriving a final chroma value for the central pixel based at least in part upon the actual chroma value and the de-noised chroma value; and
 deriving a de-noised pixel value for the central pixel based at least in part upon the final chroma value and the actual luminance value;
 wherein the method is performed by one or more computing devices.

25. The method of claim 24, wherein the actual luminance value for the central pixel is derived based at least in part upon a combination of the sensed pixel value and the one or more derived pixel values.

26. The method of claim 25, wherein generating a plurality of luminance values for the matrix of pixels comprises:
 selecting a certain pixel in the matrix of pixels, wherein the certain pixel has a pixel value for a first color of the several predetermined colors, wherein the certain pixel has a first set of one or more neighboring pixels each having a pixel value for a second color of the several predetermined colors, and wherein the certain pixel has a second set of one or more neighboring pixels each having a pixel value for a third color of the several predetermined colors; and
 deriving a luminance value for the certain pixel based at least in part upon a combination of the pixel value of the certain pixel, the pixel values of the first set of neighboring pixels, and the pixel values of the second set of neighboring pixels.

27. The method of claim 26, wherein the actual chroma value is defined as the ratio between the sensed pixel value and the actual luminance value, and wherein the de-noised chroma value is defined as the ratio between the filtered pixel value and the filtered luminance value.

28. The method of claim 24, wherein the central pixel is the only pixel in the matrix of pixels that is required to be demosaiced.

29. The method of claim 24, wherein the several predetermined colors are red, blue, and green, and wherein the pixels in the matrix of pixels are arranged in a Bayer pattern to form the portion of the mosaic image.

30. The method of claim 29, wherein applying one or more filters to the plurality of pixel values comprises:
applying a first set of one or more filters to the plurality of pixel values if the sensed pixel value for the central pixel is for the red or blue colors; and
applying a second and different set of one or more filters to the plurality of pixel values if the sensed pixel value for the central pixel is for the green color.

31. The method of claim 30, wherein applying the same one or more filters to the plurality of luminance values comprises:
applying the first set of one or more filters to the plurality of luminance values if the sensed pixel value for the central pixel is for the red or blue colors; and
applying the second set of one or more filters to the plurality of luminance values if the sensed pixel value for the central pixel is for the green color.

32. The method of claim 24, wherein deriving a final chroma value for the central pixel comprises:
accessing a set of edge/detail information indicating whether the central pixel is situated at or near an edge;
deriving a difference threshold based at least in part upon the edge/detail information;
deriving a chroma difference between the de-noised chroma value and the actual chroma value; and
deriving a final chroma value for the central pixel based at least in part upon the difference threshold, the chroma difference, the de-noised chroma value and the actual chroma value.

33. The method of claim 32, wherein deriving a final chroma value for the central pixel based at least in part upon the difference threshold, the chroma difference, the de-noised chroma value and the actual chroma value comprises:
if the absolute value of the chroma difference is greater than twice the difference threshold, setting the final chroma value to be the actual chroma value;
if the absolute value of the chroma difference is less than the difference threshold, setting the final chroma value to be the de-noised chroma value; and
if the absolute value of the chroma difference is between the difference threshold and twice the difference threshold, deriving the final chroma value based at least in part upon the actual chroma value, the de-noised chroma value, and the difference threshold.

34. The method of claim 24, wherein deriving a de-noised pixel value for the central pixel comprises:
deriving a high luminance de-noised pixel value for the central pixel based at least in part upon the actual luminance value and the final chroma value;
deriving a low luminance de-noised pixel value for the central pixel based at least in part upon the actual luminance value and the final chroma value; and
deriving a final de-noised pixel value for the central pixel based at least in part upon the high luminance de-noised pixel value and the low luminance de-noised pixel value.

* * * * *